Feb. 19, 1952

C. C. GRAVES 2,586,324

HAY LOADING ATTACHMENT

Filed March 8, 1948

Clarence C. Graves
INVENTOR.

BY Clarence A. O'Brien
and Harvey B. Jacobson
Attorneys

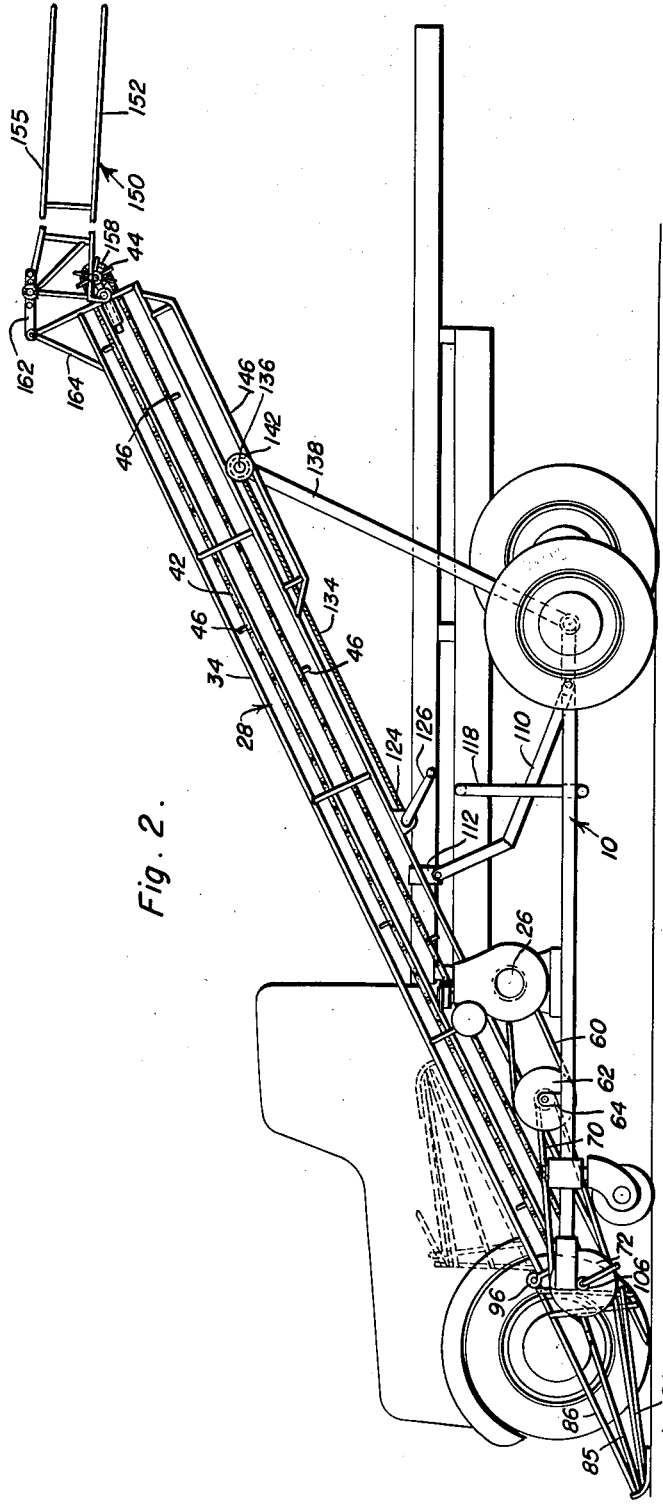

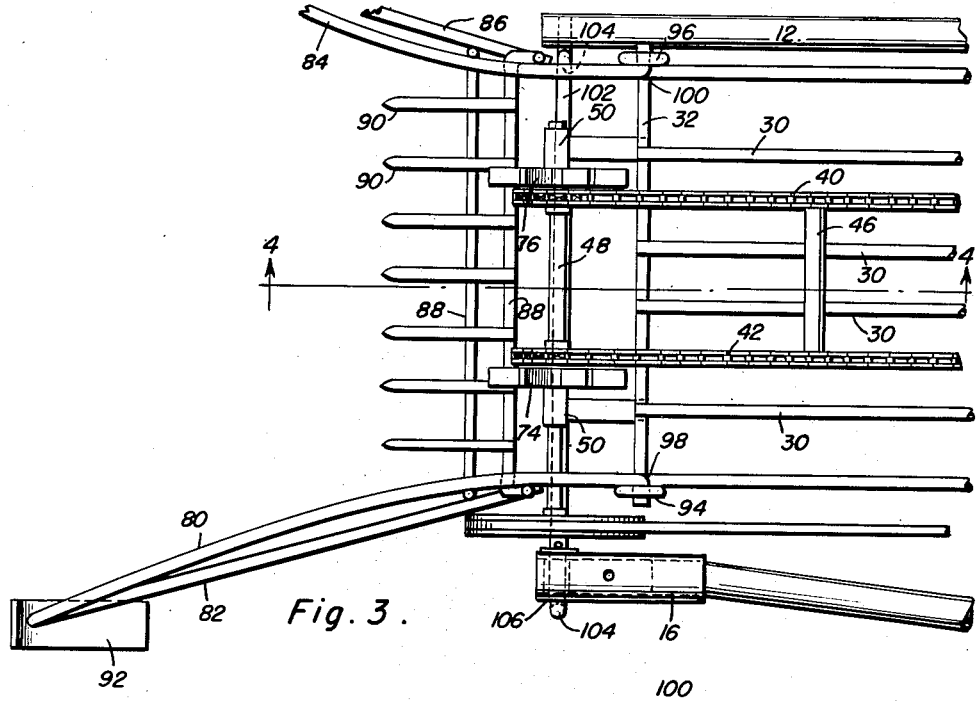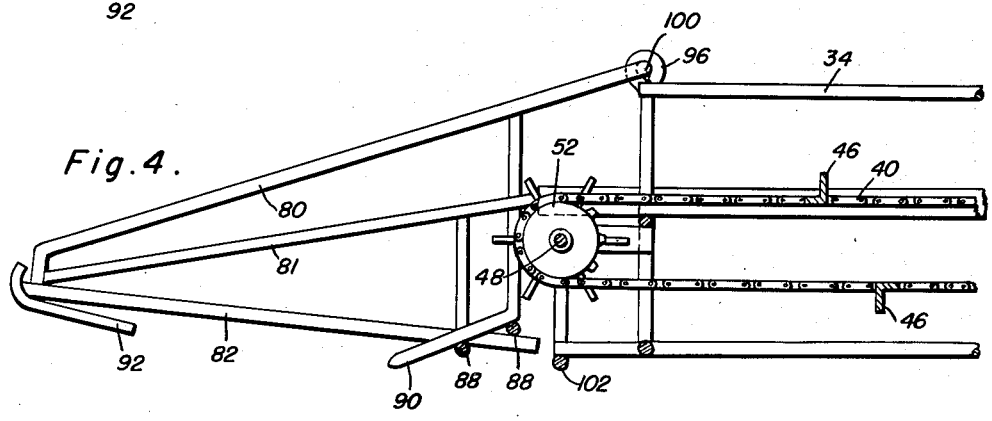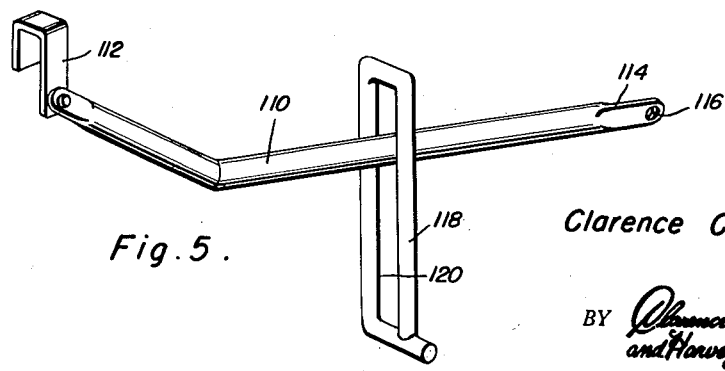

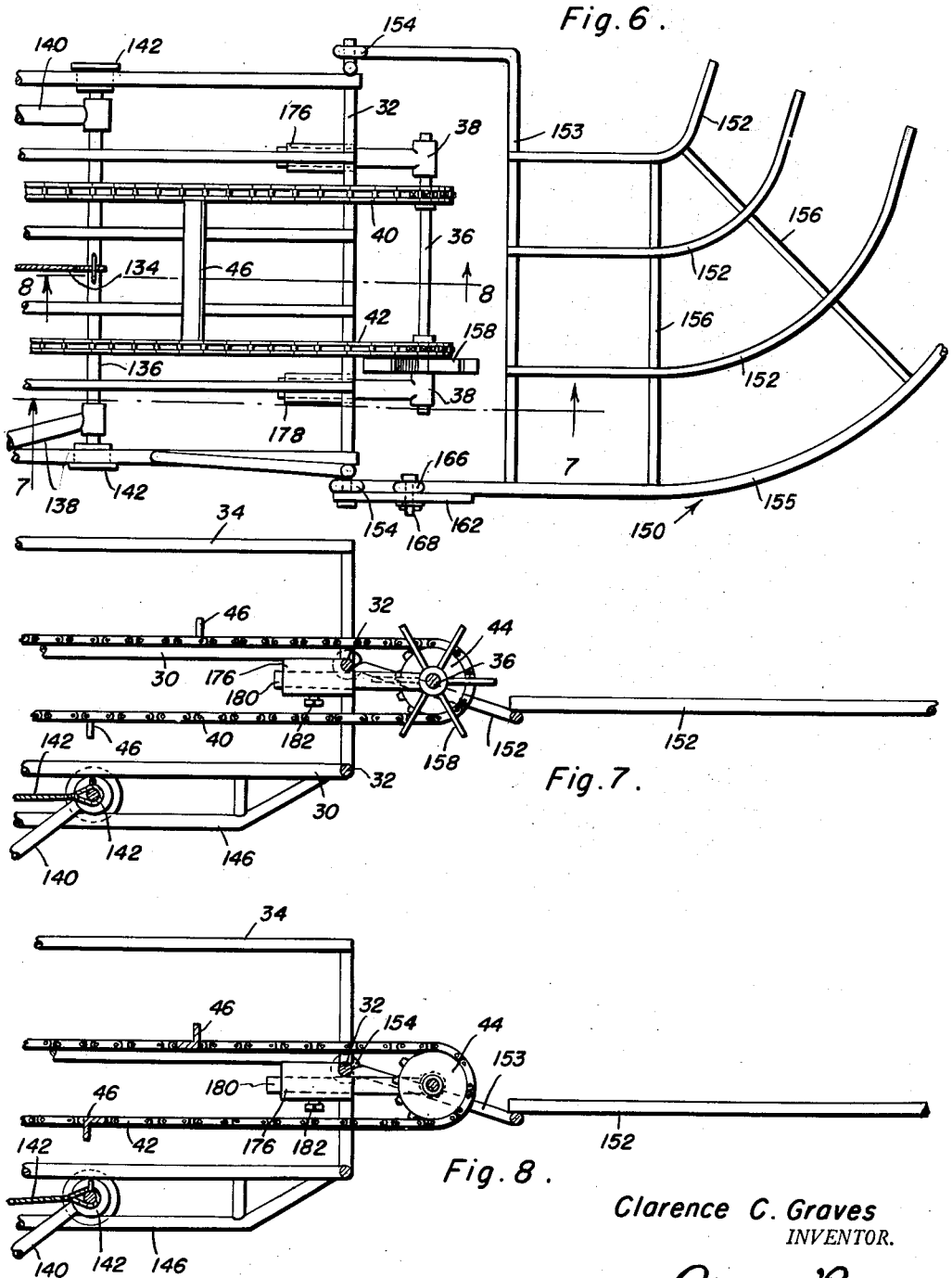

Patented Feb. 19, 1952

2,586,324

UNITED STATES PATENT OFFICE 2,586,324

HAY LOADING ATTACHMENT

Clarence C. Graves, Clinton, Okla.

Application March 8, 1948, Serial No. 13,650

2 Claims. (Cl. 214—83.26)

This invention appertains to novel and useful improvements in farm attachments for vehicles or implements for use alone in transporting packages such as bales of hay or the like from one position to another.

An object of this invention is to receive, lift and direct a bale of hay or the like from one location to another.

Another object of this invention is to convey a bale of hay or the like after guiding the same on a raft to a desired location.

Another object of this invention is to direct the bale of hay across a guide beam which is attached to the raft by pivotal and adjustable connections.

Yet another object of this invention is to support a ramp, scoop and guide by a pivotal connection to a frame, which frame is supplied with a pair of wheels and a caster spaced therefrom.

Another object of this invention is to provide improved means for attaching the frame to a conventional vehicle.

Another object of this invention is to actuate an endless conveyor on the ramp for lifting bales of hay or other suitable packages to a truck, barn or any other desired elevation.

Another purpose of this invention is to provide a simplified device of the character described which is adjustable in various respects and to various positions.

Ancillary objects and features of novelty will become apparent to those skilled in the art, in following the description of the preferred form of the invention, illustrated in the accompanying drawings, wherein:

Figure 2 is a side elevational view of the invention illustrated in Figure 1;

Figure 3 is a fragmentary enlarged plan view illustrating details of construction;

Figure 4 is a sectional view taken substantially on the line 4—4 of Figure 3 and in the direction of the arrows;

Figure 5 is a perspective view of the bar and limting means therefor, utilized for attaching the device to a vehicle;

Figure 6 is an enlarged plan view illustrating details of construction;

Figure 7 is a sectional view taken substantially on the line 7—7 of Figure 6 and in the direction of the arrows, and;

Figure 8 is a sectional view taken substantially on the line 8—8 of Figure 6 and in the direction of the arrows.

Figure 1:
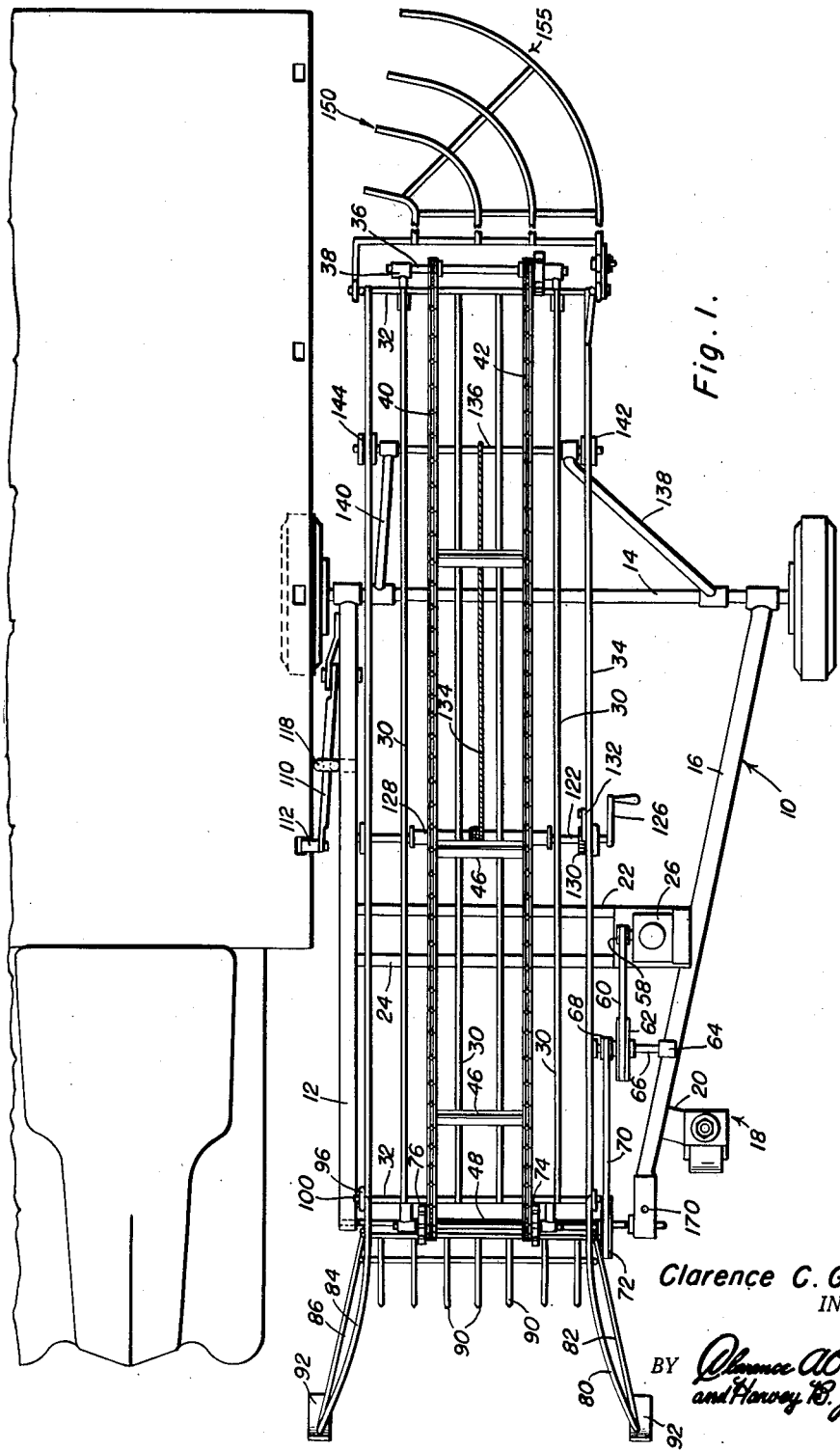
Figure 1 is a plan view of the preferred form of the invention.

This invention has been developed to provide a device for the purpose of lifting packages such as bales of hay or the like from the ground or other locations to an elevated position either in the field or for storage purposes. The particular means for treating the packages forms the present invention and will be described in detailed at this time.

A frame best illustrated in Figures 1 and 2 is provided and generally indicated at 10. This frame includes a side member 12 having an axle 14 journalled in a suitable bearing therein and an opposite side member 16 which is attached to the said shaft or axle 14, converging toward the forward end of the said side member 12. A conventional caster assembly generally indicated at 18 is attached to the converging side member 16 by means of a suitable bracket 20.

Suitable cross members 22 and 24 respectively extend across the side members 12 and 16 in order to accommodate a conventional prime mover, preferably an internal combustion engine 26. This prime mover is utilized for actuating an endless conveyor which is positioned in a ramp generally indicated at 28.

The said ramp consists of a plurality of longitudinal base members 30 suitably connected to transverse members 32 by any suitable means such as welding, brazing, bolting or the like. Side rails 34 are attached to the said ramp, and form a portion thereof in order to guide bales of hay or the like in transit on the ramp.

Journalled at one end of the ramp 28 is a shaft 36. This shaft is fitted in suitable bearings 38 and is free to rotate. Conventional chains 40 and 42 respectively extend over suitable gears 44 to form an operative portion of an endless conveyor. Angle iron cross members 46 extend between the chains to supply a bed for bales of hay or other packages.

At the opposite end of the said ramp 28 a second shaft 48 is journalled in suitable bearings 50 which are rigidly connected to the cross member 32 and consequently to the said ramp 28. This shaft is supplied with gears 52 whereon the said chains 40 and 42 respectively are entrained. By this expedient an endless conveyor is formed.

Means for actuating the endless conveyor includes the said internal combustion engine 26 having a pulley 58 supplied on its drive shaft. A V-groove belt 60 or other suitable equivalent extends over the said pulley 58 and a second pulley 62. The said pulley 62 is journalled in suitable bearings and brackets 64 supplied on the said frame 10 and more specifically on a shaft 66. A smaller pulley 68 is supplied on the said shaft 66 and has a second V-groove belt 70 entrained therearound. The said second belt 70 is entrained about a final pulley 72 which is journalled by means of attachment with the shaft 48. Upon actuation of the conventional internal combustion engine 26 the said endless conveyor will be rendered operative in order to convey packages. In order to assist in this conveying a pair of wheels having spokes thereon or paddles 74 and 76 respectively are secured to the said shaft 48. By this expedient the initial reception of the package on the endless conveyor is assisted.

A scoop comprising a plurality of metallic bars 80 and 82 on one side thereof and 84 and 86 on the other side thereof is supplied. Cross bars 88 are secured between the number of side bars for strengthening purposes. The said side bars converge to form a scoop-like apparatus for receiving packages or bales of hay. A plurality of tines 90 may be secured to the said cross bars 88 and attached firmly by means of welding, brazing or the like. These tines also assist in scooping the bales of hay from the ground for reception on the endless conveyor. Shoes 92 may be supplied at the terminal portion of the number of arms 82, 80 and 81 at one side of the scoop and 84, 85 (see Figure 2) and 86. The shoes obviously ride along the ground in operation of the invention in association with a field of hay.

The said scoop is pivotally secured to a pair of eyes 94 and 96 respectively which are secured to the said ramp. By this expedient the entire assemblage forming the scoop may be pivoted to the inoperative position as is seen in Figure 2, when found desirable. Further, the scoop may be easily detached by simply urging the curved ends 98 and 100 respectively from the hooks 94 and 96.

A rod 102 having curved end portions 104 is secured to the said ramp 28. This rod pivots the ramp to the frame 10, the curved end portion 104 terminating in suitable bosses 106 formed in the side bars or members 12 and 16 respectively. By this suspension the frame and ramp may be mutually pivoted without the necessity of compensation in the pulley and belt drive from the internal combustion engine 26 to the endless conveyor.

Means for attaching the said frame 10 to a conventional prime mover such as a truck or the like is provided. The preferable means may be seen best in Figure 5 wherein there is disclosed a bar 110 having a bend therein. One end of the said bar has a pivot pin extending therethrough in order to accommodate a substantially U-shaped bracket 112, utilized for attachment to a conventional suitable element of a truck. The opposite end of the said bar 110 is provided with a reduced portion 114 having an aperture therein. A conventional pivot pin or small stub shaft may be inserted through the said aperture 116 for pivotally associating the said bar with the frame 10.

Means for limiting or restricting the travel of the bar in its pivotal movement is provided. The preferable means may be seen as the bracket 118 being formed with an elongated slot 120 therein. The said bracket 118 is rigidly secured to the said frame 10 through the medium of conventional welding, brazing or the like. The bar 110 extends in the elongated slot and may ride within the limits of the elongated slot 120.

Means for selectively raising and lowering the said ramp 28 and maintaining it in the raised and lowered position is provided. The preferable means consists of a winch construction including a shaft 122 journalled in the said ramp through the medium of conventional small brackets 124. This shaft also may have a handle 126 detachably secured thereto for actuation purposes.

A drum 128 is supplied on the said shaft 122 whereon a cable is adapted to be wound. In order to maintain the shaft in the selected position a conventional ratchet gear 130 is rigidly secured to the said shaft 122 and a pawl or dog 132 is pivotally mounted on the ramp 28 adjacent the ratchet gear 130 for engagement therewith.

A cable 134 is attached to the said drum 128 and extends to a rod 136 which is journalled in suitable bearings or bosses formed at the ends of a pair of rods 138 and 140 respectively. The rods 138 and 140 are in turn pivotally mounted on the said axle or shaft 14 by means of conventional bosses or bearings. Also positioned on the said rod 136 is a pair of rollers 142 and 144 respectively which are rollingly supported in a track 146 formed on each lateral side of the ramp 28. Upon winding the handle 126, the cable 134 will move the rollers in selected portions of the track 146 depending from the ramp 28. Due to the arms or rods 138 and 140 respectively which are positioned as described above, the ramp 28 will be pivoted.

Means for guiding the packages when they have reached the uppermost portion of the ramp 28, is supplied. The preferable means consists of a guide or guide way generally indicated at 150. The said guide way is arcuate in configuration and is formed of a plurality of rods 152 which are attached to a substantially U-shaped main frame member 153. This main frame member is formed with an eye 154 at each end thereof to form a portion of a pivotal connection therebetween and between the upper portion of the ramp 28. Suitable supporting or stiffening members 156 extend across the curved guide elements 152 for the obvious purpose of additional support.

Referring now to Figure 2 a fence is formed around the guide 150, contributing to the additive effect of the above described structure. This fence indicated at 155 is composed of metallic stock and serves the purpose of additional support and baffle for the packages after they leave the endless conveyor. In order to urge the packages or bales of hay in an arcuate direction a paddle wheel 158 is rigidly secured to the said shaft 36 adjacent one end thereof. This paddle wheel is identical to the above described paddle wheels 74 and 76.

Each end of the substantially U-shaped member is formed with the said eye 154 which are journalled on an end member 32 forming a portion of the said ramp 28. This of course, renders the entire guide or guide way pivotal. In order to maintain the guide way in the selective pivoted position an apertured strap 162 is pivotally secured to a small truss 164 which is in turn rigidly associated with the said ramp 28. An eye 166 is supplied in the fence work 158 to accommodate a pin 168 which may be received in a selected aperture in the said strap 162. By this expedient the angle of inclination of the guide may be adjusted for various purposes as when the ramp is in selected degrees of angularity relative to a horizontal plane, in order to have a substantially horizontal egress guide or portion of the device.

When the invention is in transit the scoop may be pivoted to the inoperative position or if desired, removed and the bar 110 detached. This bar may be slid in a bore formed in the terminal portion of the said side bar 16 and a pin inserted therethrough and locked by means of the suitable pin being received in the aperture 170. Of course, if it is found desirable or necessary a different bar may be utilized. By this medium the device may be attached to the rear portion of a conventional truck thereby rendering it more facile to transport.

If it is found desirable the said shaft 36, supported in the bosses and/or bearings 38 may be adjusted in order to compensate for slack in the chains 40 and 42. When this construction is described (see Figure 7) a pair of sleeves 176 and 178 will be rigidly secured to an end member of the said ramp and small stub shaft 180 positioned therein.

These shafts may be maintained in place through the medium of conventional set screws or the like and of course, the bearings or bosses 38 will be attached directly thereto.

While there has been described and illustrated but a preferred embodiment of the invention, it is apparent that variations may be made without departing from the spirit thereof. Therefore, limitation is sought only in accordance with the scope of the following claims.

Having described the invention, what is claimed as new is:

1. A package loading apparatus comprising a ramp, a wheel bearing frame, means for pivotally securing said ramp to said frame for movement about a horizontal axis, means for maintaining said ramp in selected pivoted positions, means pivoted to said frame for attaching said frame to a vehicle for movement in a vertical plane and about an axis parallel to said horizontal axis, said last mentioned means including a bar, and a guide secured to said frame for restricting the travel of said bar.

2. A package loading apparatus comprising a frame having a pair of wheels, a ramp pivotally secured to said frame, a ground engaging scoop pivotally secured to one end of said frame, a package handling curved guide secured to the opposite end of said frame, means for pivotally adjusting said guide, means for raising and lowering said frame, an endless conveyor carried by said ramp, a prime mover on said frame drivingly connected with said conveyor, a bar pivotally attached to said frame for attachment with a vehicle, and a bracket attached to said frame for limiting the pivotal travel of said bar.

CLARENCE C. GRAVES.

REFERENCES CITED

The following references are of record in the file of this patent:

UNITED STATES PATENTS

| Number | Name | Date |
|---|---|---|
| 998,724 | Townsend | July 25, 1911 |
| 1,009,821 | Albertson | Nov. 28, 1911 |
| 1,459,271 | Von Engeln | June 19, 1923 |
| 1,589,495 | Wentz | June 22, 1926 |
| 1,853,253 | Bennett | Apr. 12, 1932 |
| 2,056,501 | Berger | Oct. 6, 1936 |
| 2,373,325 | Mayer | Apr. 10, 1945 |
| 2,400,086 | Hansen | May 14, 1946 |
| 2,403,636 | Chantland | July 9, 1946 |
| 2,442,267 | Eksergian | May 25, 1948 |
| 2,446,083 | Fehlberg | July 27, 1948 |